United States Patent
Park et al.

(10) Patent No.: US 9,099,251 B2
(45) Date of Patent: Aug. 4, 2015

(54) ENERGY STORAGE APPARATUS

(71) Applicant: SAMSUNG ELECTRO-MECHANICS CO., LTD., Gyeonggi-do (KR)

(72) Inventors: Sung Yeol Park, Gyeonggi-do (KR); Yeong Su Cho, Gyeonggi-do (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 176 days.

(21) Appl. No.: 13/833,579

(22) Filed: Mar. 15, 2013

(65) Prior Publication Data

US 2013/0286543 A1    Oct. 31, 2013

(30) Foreign Application Priority Data

Apr. 25, 2012  (KR) .................. 10-2012-0043323

(51) Int. Cl.
| | |
|---|---|
| *H01G 11/26* | (2013.01) |
| *H01G 9/15* | (2006.01) |
| *H01G 11/24* | (2013.01) |
| *H01G 11/12* | (2013.01) |
| *H01G 11/72* | (2013.01) |
| *H01G 11/76* | (2013.01) |
| H01G 4/30 | (2006.01) |

(52) U.S. Cl.
CPC ............. *H01G 11/24* (2013.01); *H01G 9/151* (2013.01); *H01G 11/12* (2013.01); *H01G 11/26* (2013.01); *H01G 11/72* (2013.01); *H01G 11/76* (2013.01); *H01G 4/30* (2013.01); *Y02E 60/13* (2013.01); *Y02T 10/7022* (2013.01)

(58) Field of Classification Search
CPC .......... H01G 11/26; H01G 4/30; H01G 9/151
See application file for complete search history.

(56) References Cited

U.S. PATENT DOCUMENTS

| | | | |
|---|---|---|---|
| 2005/0207093 A1* | 9/2005 | Togashi et al. ............. | 361/321.2 |
| 2009/0175011 A1 | 7/2009 | Kariya | |
| 2011/0170234 A1* | 7/2011 | Lee et al. ...................... | 361/502 |
| 2011/0317331 A1* | 12/2011 | Lee et al. ...................... | 361/502 |

FOREIGN PATENT DOCUMENTS

| | | |
|---|---|---|
| KR | 2005-0071980 A | 7/2005 |
| KR | 2006-0062543 A | 6/2006 |

* cited by examiner

*Primary Examiner* — Dion R Ferguson
(74) *Attorney, Agent, or Firm* — McDermott Will & Emery LLP

(57) ABSTRACT

The present invention relates to an energy storage apparatus capable of preventing performance degradation by reducing resistance during movement of charges between layers in a multilayer capacitor with very high capacity includes: a plurality of cathode layers for storing positive charges; a plurality of anode layers for storing negative charges; a plurality of separation layers for electrically separating the cathode layers and the anode layers; a cathode hole for introducing the positive charge into the cathode layer from the outside or discharging the positive charge from the cathode layer to the outside; an anode hole for introducing the negative charge into the anode layer from the outside or discharging the negative charge from the anode layer to the outside; a cathode conducting unit for moving the positive charge; and an anode conducting unit for moving the negative charge.

22 Claims, 8 Drawing Sheets

ENERGY STORAGE APPARATUS

CROSS-REFERENCE TO RELATED APPLICATIONS

Claim and incorporate by reference domestic priority application and foreign priority application as follows:

CROSS REFERENCE TO RELATED APPLICATION

This application claims the benefit under 35 U.S.C. Section 119 of Korean Patent Application Serial No. 10-2012-0043323, entitled filed Apr. 25, 2012, which is hereby incorporated by reference in its entirety into this application.

BACKGROUND OF THE INVENTION

1. Field of the Invention

The present invention relates to an energy storage apparatus, and more particularly, to an energy storage apparatus capable of preventing performance degradation by reducing resistance during movement of charges between layers in a multilayer capacitor with very high capacity such as a supercapacitor.

2. Description of the Related Art

Since a supercapacitor, which is a capacitor with very high capacitance, uses a charge phenomenon by movement of ions to the interface between an electrode and an electrolyte or a surface chemical reaction unlike a battery using a chemical reaction, it can perform rapid charge/discharge and has high charge/discharge efficiency and semipermanent life. Accordingly, a supercapacitor has been used as an energy storage apparatus for stable power supply to electronic products, electric vehicles, and industrial electronic devices.

This supercapacitor has a multilayer structure in which several electrode layers are stacked. That is, a cathode layer and an anode layer are alternately stacked, and a separation layer is present between the cathode layer and the anode layer to separate the cathode layer and the anode layer from each other. In the multilayer structure formed like this, in order to electrically connect electrodes, that is, an electrode of the cathode layer and an electrode of the anode layer to external devices, an electrical connection structure should be included.

In this case, due to characteristics of the multilayer structure, a charge present on each layer should face only the electrode in order to move to the electrode and a moving path of the charge is limited, thus causing performance degradation of the supercapacitor due to a resistance increase during the movement of the charge.

RELATED ART DOCUMENT

Patent Document

Patent Document 1: Korean Patent Laid-open Publication No. 10-2005-0071980

SUMMARY OF THE INVENTION

The present invention has been invented in order to overcome the above-described problems and it is, therefore, an object of the present invention to provide an energy storage apparatus capable of reducing resistance of a charge during movement of the charge by forming another hole in addition to a hole connected to an external electrode and electrically connecting between the holes to diversify a moving path of the charge in the movement of the charge, and improving performance of a supercapacitor.

In accordance with one aspect of the present invention to achieve the object, there is provided an energy storage apparatus including: a plurality of cathode layers for storing positive charges; a plurality of anode layers for storing negative charges; a plurality of separation layers for electrically separating the cathode layers and the anode layers; a cathode hole formed in the cathode layer and electrically connected to an external electrode for introducing the positive charge into the cathode layer from the outside or discharging the positive charge from the cathode layer to the outside; an anode hole formed in the anode layer and electrically connected to an external electrode for introducing the negative charge into the anode layer from the outside or discharging the negative charge from the anode layer to the outside; a cathode conducting unit for moving the positive charge between the plurality of cathode layers; and an anode conducting unit for moving the negative charge between the plurality of anode layers.

The cathode layer and the anode layer may be alternately separately stacked, and the separation layer may be stacked between the cathode layer and the anode layer.

The energy storage apparatus may further include a first conducting pin for electrically connecting the plurality of cathode layers to each other by vertically penetrating the cathode layers; and a second conducting pin for electrically connecting the plurality of anode layers to each other by vertically penetrating the anode layers, the cathode conducting unit may include a first cathode conducting hole formed with the same diameter as the first conducting pin to penetrate the first conducting pin therethrough and electrically short the first conducting pin and the cathode layer; and a second cathode conducting hole formed with a larger diameter than the second conducting pin to penetrate the second conducting pin therethrough and electrically open the second conducting pin and the cathode layer, and the anode conducting unit may include a first anode conducting hole formed with a larger diameter than the first conducting pin to penetrate the first conducting pin therethrough and electrically open the first conducting pin and the anode layer; and a second anode conducting hole formed with the same diameter as the second conducting pin to penetrate the second conducting pin therethrough and electrically short the second conducting pin and the anode layer.

The separation layer may include a first separation hole formed to penetrate the first conducting pin therethrough; and a second separation hole formed to penetrate the second conducting pin therethrough.

The first separation hole and the second separation hole may be formed with a larger diameter than the first conducting pin and the second conducting pin.

The cathode hole may be formed on the corner side opposite to the second cathode conducting hole in the cathode layer, and the anode hole may be formed on the corner side opposite to the first anode conducting hole in the anode layer.

The energy storage apparatus may further include a first external electrode for introducing the positive charge into the cathode layer from the outside or discharging the positive charge from the cathode layer to the outside; and a second external electrode for introducing the negative charge into the anode layer from the outside or discharging the negative charge from the anode layer to the outside.

The energy storage apparatus may further include a cathode connecting unit formed on the cathode hole and first conducting pin sides and having a shape of surrounding one side of the energy storage apparatus; and an anode connecting unit formed on the anode hole and second conducting pin sides and having a shape of surrounding the other side of the energy storage apparatus.

The cathode connecting unit and the anode connecting unit may have a '⊏' shape.

The inner surfaces of the cathode connecting unit and the anode connecting unit may be coated with an insulator.

The cathode connecting unit may include a first connecting hole electrically connected to the first conducting pin; and a first external electrode hole electrically connected to a positive external electrode pin, and the anode connecting unit may include a second connecting hole electrically connected to the second conducting pin; and a second external electrode hole electrically connected to a negative external electrode pin.

In accordance with another aspect of the present invention to achieve the object, there is provided an energy storage apparatus including: a plurality of cathode layers for storing positive charges; a plurality of anode layers for storing negative charges; a plurality of separation layers for electrically separating the cathode layers and the anode layers; a first cathode hole formed in the cathode layer and formed with the same diameter as a positive external electrode pin to penetrate the positive external electrode pin therethrough and electrically short the positive external electrode and the cathode layer; a second cathode hole formed in the cathode layer and formed with a larger diameter than a negative external electrode pin to penetrate the negative external electrode pin therethrough and electrically open the negative external electrode pin and the cathode layer; a first anode hole formed in the anode layer and formed with a larger diameter than the positive external electrode pin to penetrate the positive external electrode pin therethrough and electrically open the positive external electrode pin and the anode layer; a second anode hole formed in the anode layer and formed with the same diameter as the negative external electrode pin to penetrate the negative external electrode pin therethrough and electrically short the negative external electrode pin and the anode layer; a cathode conducting unit for moving the positive charge between the plurality of cathode layers; and an anode conducting unit for moving the negative charge between the plurality of anode layers.

The cathode layer and the anode layer may be alternately separately stacked, and the separation layer may be stacked between the cathode layer and the anode layer.

The energy storage apparatus may further include a first conducting pin for electrically connecting the plurality of cathode layers to each other by vertically penetrating the cathode layers; and a second conducting pin for electrically connecting the plurality of anode layers to each other by vertically penetrating the anode layers, the cathode conducting unit may include a first cathode conducting hole formed with the same diameter as the first conducting pin to penetrate the first conducting pin therethrough and electrically short the first conducting pin and the cathode layer; and a second cathode conducting hole formed with a larger diameter than the second conducting pin to penetrate the second conducting pin therethrough and electrically open the second conducting pin and the cathode layer, and the anode conducting unit may include a first anode conducting hole formed with a larger diameter than the first conducting pin to penetrate the first conducting pin therethrough and electrically open the first conducting pin and the anode layer; and a second anode conducting hole formed with the same diameter as the second conducting pin to penetrate the second conducting pin therethrough and electrically short the second conducting pin and the anode layer.

The separation layer may include a first separation hole formed to penetrate the first conducting pin therethrough; a second separation hole formed to penetrate the second conducting pin therethrough; a first separation electrode hole formed to penetrate the positive external electrode pin therethrough; and a second separation electrode hole formed to penetrate the negative external electrode pin therethrough.

The first separation hole and the second separation hole may be formed with a larger diameter than the first conducting pin and the second conducting pin, and the first separation electrode hole and the second separation electrode hole may be formed with a larger diameter than the positive external electrode pin and the negative external electrode pin.

The first cathode hole may be formed on the corner side opposite to the second cathode conducting hole in the cathode layer, the second cathode hole may be formed on the corner side opposite to the first cathode conducting hole in the cathode layer, the first anode hole may be formed on the corner side opposite to the second anode conducting hole in the anode layer, and the second anode hole may be formed on the corner side opposite to the first anode conducting hole in the anode layer.

The energy storage apparatus may further include a first external electrode for introducing the positive charge into the cathode layer from the outside or discharging the positive charge from the cathode layer to the outside; and a second external electrode for introducing the negative charge into the anode layer from the outside or discharging the negative charge from the anode layer to the outside.

The energy storage apparatus may further include a cathode connecting unit formed on the cathode hole and first conducting pin sides and having a shape of surrounding one side of the energy storage apparatus; and an anode connecting unit formed on the anode hole and second conducting pin sides and having a shape of surrounding the other side of the energy storage apparatus.

The cathode connecting unit and the anode connecting unit may have a '⊏' shape.

The inner surfaces of the cathode connecting unit and the anode connecting unit may be coated with an insulator.

The cathode connecting unit may include a first connecting hole electrically connected to the first conducting pin; and a first external electrode hole electrically connected to the positive external electrode pin, and the anode connecting unit may include a second connecting hole electrically connected to the second conducting pin; and a second external electrode hole electrically connected to the negative external electrode pin.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, specific embodiments of the present invention will be described with reference to the drawings. However, the following embodiments are provided as examples, and the present invention should not be construed as limited to the embodiments.

In describing the present invention, descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

The technical spirit of the present invention should be defined by the attached claims, and the following embodiments are provided to efficiently explain the technical spirit of the invention to those skilled in the art.

Hereinafter, the present invention will be described with reference to the accompanying drawings.

Figure 1:
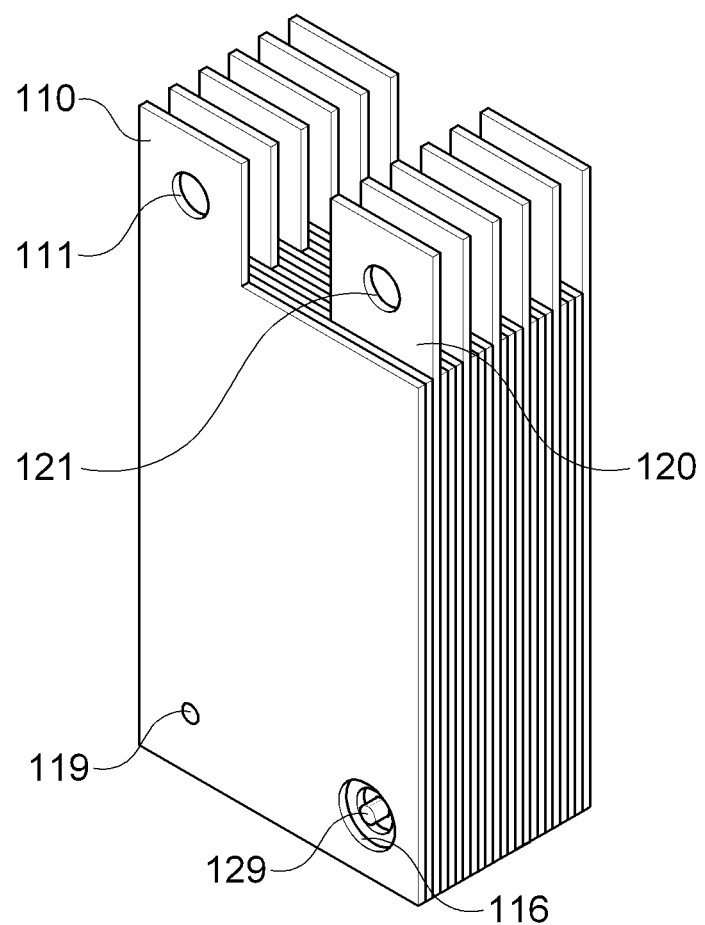
FIG. 1 is a view showing an energy storage apparatus in accordance with an embodiment of the present invention.
Figure 2:
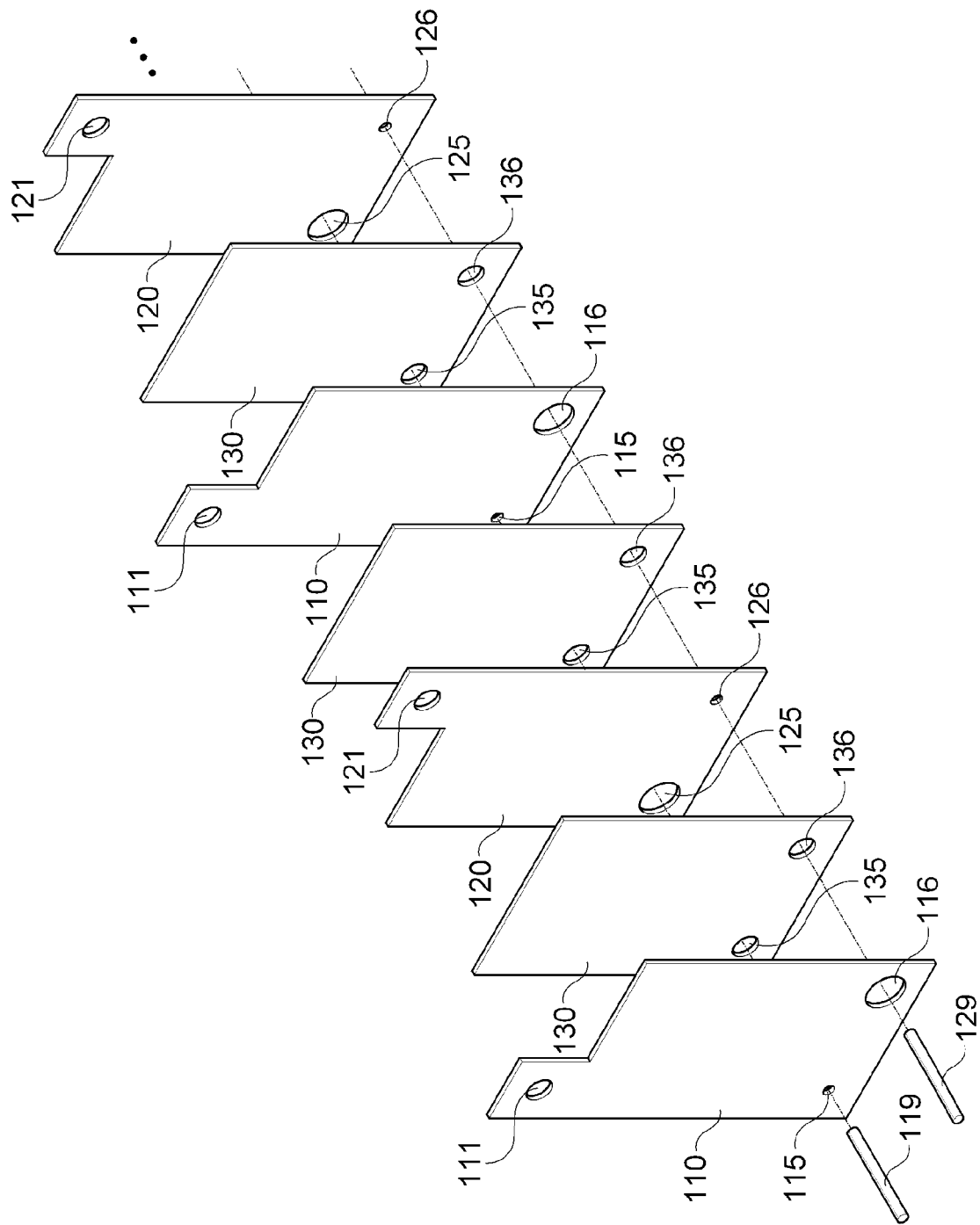
FIG. 2 is a view showing the stacking order of a cathode layer, a separation layer, and an anode layer in accordance with an embodiment of the present invention.
Figure 3:
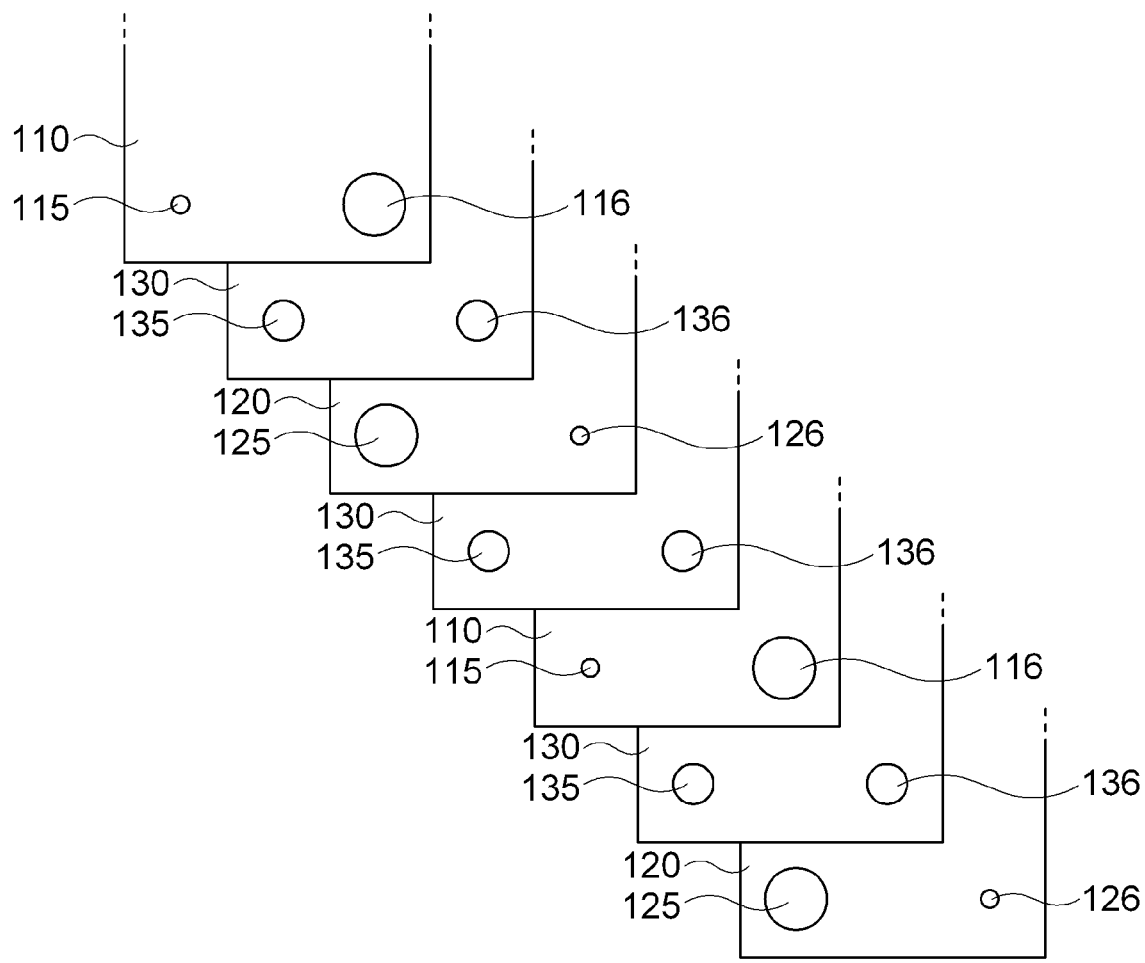
FIG. 3 is a view showing the comparison of diameter size of a cathode conducting hole, a separation hole, and an anode conducting hole.

FIG. 1 is a view showing an energy storage apparatus in accordance with an embodiment of the present invention, FIG. 2 is a view showing the stacking order of a cathode layer, a separation layer, and an anode layer in accordance with an embodiment of the present invention, and FIG. 3 is a view showing the comparison of diameter size of a cathode conducting hole, a separation hole, and an anode conducting hole.

Referring to FIGS. 1 to 3, an energy storage apparatus 100 in accordance with an embodiment of the present invention includes a plurality of cathode layers 110 for storing positive charges; a plurality of anode layers 120 for storing negative charges; a plurality of separation layers 130 for electrically separating the cathode layers 110 and the anode layers 120; a cathode hole 111 formed in the cathode layer 110 and electrically connected to an external electrode for introducing the positive charge into the cathode layer 110 from the outside or discharging the positive charge from the cathode layer 110 to the outside; and an anode hole 121 formed in the anode layer 120 and electrically connected to an external electrode for introducing the negative charge into the anode layer 120 from the outside or discharging the negative charge from the anode layer 120 to the outside; a cathode conducting unit for moving the positive charge between the plurality of cathode layers 110; and an anode conducting unit for moving the negative charge between the plurality of anode layers 120.

The cathode layer 110 and the anode layer 120 may be alternately separately stacked, and the separation layer 130 may be stacked between the cathode layer 110 and the anode layer 120.

The separation layer 130 may serve as an insulating layer by electrically separating the cathode layer 110 and the anode layer 120. Therefore, the positive charge of the cathode layer 110 can move only to the corresponding cathode layer 110 or another cathode layer 110, and the negative charge of the anode layer 120 can move only to the corresponding anode layer 120 or another anode layer 120. That is, in the prior art, a path through which the positive charge or the negative charge moves to the external electrode is only the cathode hole 111 or the anode hole 121, but according to the present invention, since the cathode conducting unit or the anode conducting unit is included as a new moving path of the positive charge or the negative charge, the movement of the charge becomes free. Therefore, since the path through which the positive charge or the negative charge moves to the external electrode becomes diverse, resistance of the charge during the movement of the charge is reduced and thus performance of the energy storage apparatus is improved.

In this case, as shown in FIGS. 1 and 2, the cathode layer 110 may have an 'L' shape, the anode layer 120 may have an 'L' shape which is symmetrical to a vertical axis, and the separation layer 130 may have a rectangular shape.

The energy storage apparatus may further include a first conducting pin 119 for electrically connecting the plurality of cathode layers 110 to each other by vertically penetrating the cathode layers 110; and a second conducting pin 129 for electrically connecting the plurality of anode layers 120 to each other by vertically penetrating the anode layers 120, the cathode conducting unit may include a first cathode conducting hole 115 formed with the same diameter as the first conducting pin 119 to penetrate the first conducting pin 119 therethrough and electrically short the first conducting pin 119 and the cathode layer 110; and a second cathode conducting hole 116 formed with a larger diameter than the second conducting pin 129 to penetrate the second conducting pin 129 therethrough and electrically open the second conducting pin 129 and the cathode layer 110, and the anode conducting unit may include a first anode conducting hole 125 formed with a larger diameter than the first conducting pin 119 to penetrate the first conducting pin 119 therethrough and electrically open the first conducting pin 119 and the anode layer 120; and a second anode conducting hole 126 formed with the same diameter as the second conducting pin 129 to penetrate the second conducting pin 129 therethrough and electrically short the second conducting pin 129 and the anode layer 120.

The separation layer 130 may include a first separation hole 135 formed to penetrate the first conducting pin 119 therethrough; and a second separation hole 136 formed to penetrate the second conducting pin 129 therethrough, and the first separation hole 135 and the second separation hole 136 may be formed with a larger diameter than the first conducting pin 119 and the second conducting pin 129.

The first conducting pin 119 and the first cathode conducting hole 115 may have the same diameter, and the first conducting pin 119 may be made of a conductor through which the positive charge can move. Therefore, the positive charge stored in the cathode layer 110 can move to another cathode layer 110 through the first conducting pin 119 or move to the cathode hole 111 and then move through the external electrode, and the positive charge introduced from the external electrode can be stored in the cathode layer 110 through the first conducting pin 119. Similarly, the second conducting pin 129 and the second anode conducting hole 126 may have the same diameter, and the second conducting pin 129 may be made of a conductor through which the negative charge can move. Therefore, the negative charge stored in the anode layer 120 can move to another anode layer 120 through the second conducting pin 129 or move to the anode hole 121 and then move through the external electrode, and the negative charge introduced from the external electrode can be stored in the anode layer 120 through the second conducting pin 129.

However, the diameter of the second conducting hole 116 is larger than that of the second conducting pin 129, and the diameter of the first anode conducting hole 125 is larger than that of the first conducting pin 119. Therefore, the first conducting pin 119 is electrically connected to the first cathode conducting hole 115 but is not electrically connected to the first anode conducting hole 125, and the second conducting pin 129 is electrically connected to the second anode conducting hole 126 but is not electrically connected to the second cathode conducting hole 116. That is, since the positive charge can move only through the cathode hole 111 connected to the external electrode or through the first conducting pin 119 and the negative charge can move only through the anode hole 121 connected to the external electrode or through the second conducting pin 129, electrical connection between the cathode layer 110 and the anode layer 120 is not formed.

The cathode hole 111 may be formed on the corner side opposite to the second cathode conducting hole 116 in the cathode layer 110, and the anode hole 120 may be formed on the corner side opposite to the first anode conducting hole 125 in the anode layer 120.

The energy storage apparatus may further include a first external electrode for introducing the positive charge into the cathode layer 110 from the outside or discharging the positive charge from the cathode layer 110 to the outside; and a second external electrode for introducing the negative charge into the anode layer 120 from the outside or discharging the negative charge from the anode layer 120 to the outside. The first external electrode may include a pin for electrical connection with the cathode hole 111, and the second external electrode may include a pin for electrical connection with the anode hole 121.

Figure 6A:
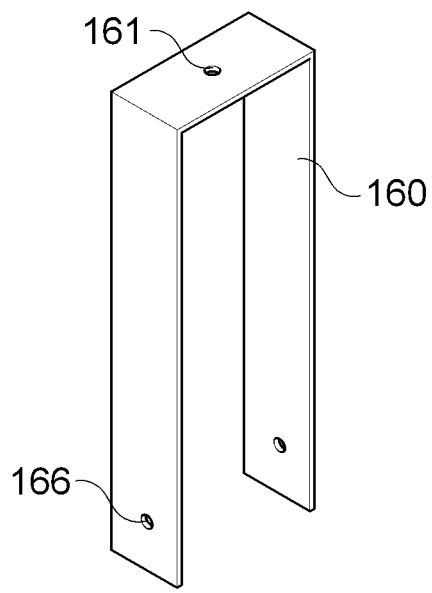
FIGS. 6A, 6B, and 6C are views showing the coupling of an external electrode connecting unit and an energy storage apparatus in accordance with an embodiment of the present invention.
Figure 6B:
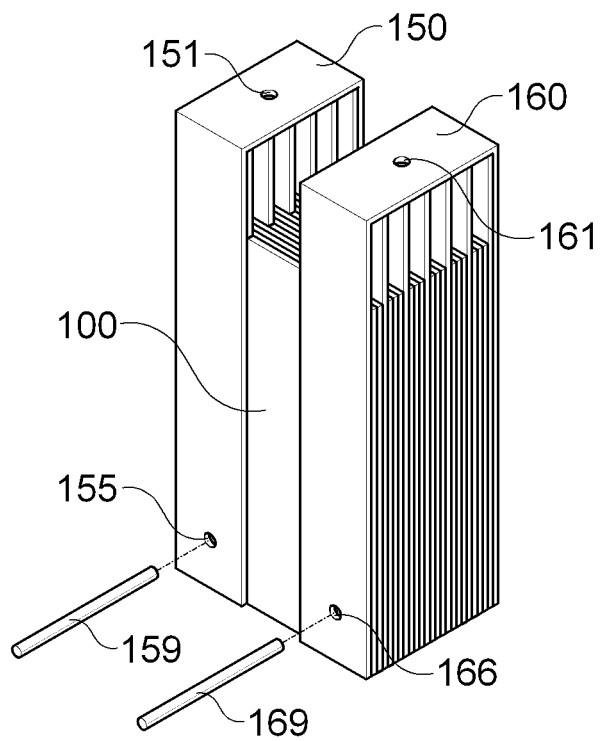
Figure 6C:
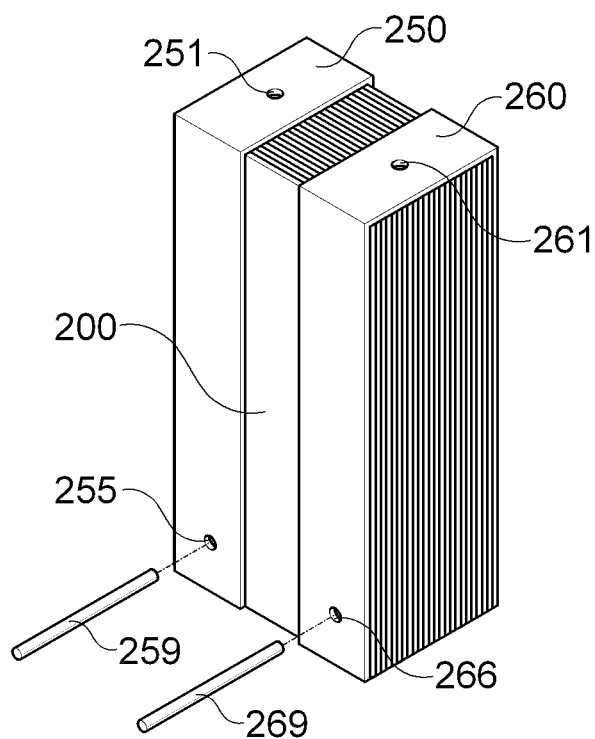
Figure 7A:
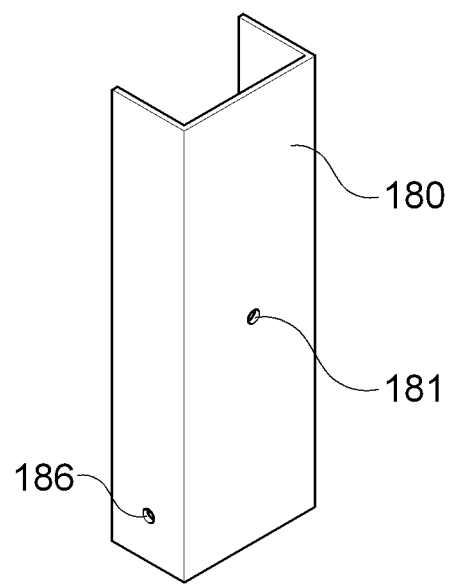
FIGS. 7A, 7B, and 7c are views showing the coupling of an external electrode connecting unit and an energy storage apparatus in accordance with another embodiment of the present invention.
Figure 7B:
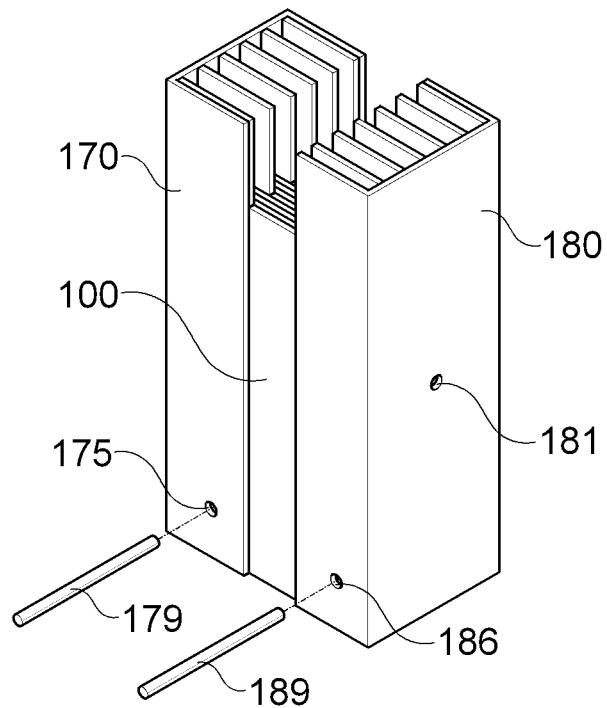
Figure 7C:
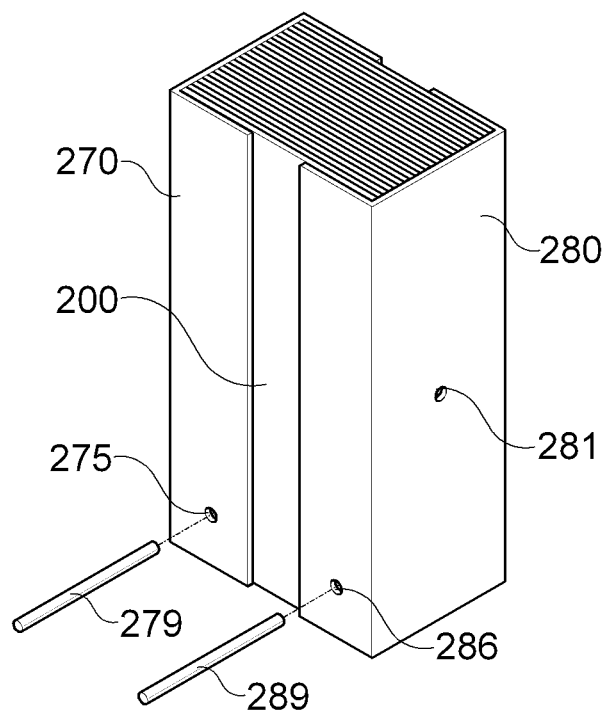

FIG. 6 is a view showing the coupling of an external electrode connecting unit and an energy storage apparatus in accordance with an embodiment of the present invention, and FIG. 7 is a view showing the coupling of an external electrode connecting unit and an energy storage apparatus in accordance with another embodiment of the present invention.

Referring to (a) and (b) of FIG. 6 and (a) and (b) of FIG. 7, the energy storage apparatus 100 may further include a cathode connecting unit 150 and 170 which is formed on the cathode hole 111 and first conducting pin 159 and 179 sides and has a shape of surrounding one side of the energy storage apparatus 100; and an anode connecting unit 160 and 180 which is formed on the anode hole 121 and second conducting pin 169 and 189 sides and has a shape of surrounding the other side of the energy storage apparatus 100.

The inner surfaces of the cathode connecting unit 150 and 170 and the anode connecting unit 160 and 180 may be coated with an insulator.

The cathode connecting unit 150 and 170 may include a first connecting hole 155 and 175 electrically connected to the first conducting pin 159 and 179; and a first external electrode hole 151 electrically connected to a positive external electrode pin, and the anode connecting unit 160 and 180 may include a second connecting hole 166 and 186 electrically connected to the second conducting pin 169 and 189; and a second external electrode hole 161 and 181 electrically connected to a negative external electrode pin. Therefore, the first connecting hole 155 and 175 is formed with the same diameter as the first conducting pin 159 and 179 and the second connecting hole 166 and 186 is formed with the same diameter as the second conducting pin 169 and 189 so that the first connecting hole 155 and 175 and the second conducting pin 169 and 189 can be electrically connected to each other.

Further, the first external electrode hole 151 is formed with the same diameter as the positive external electrode pin and the second external electrode hole 161 and 181 is formed with the same diameter as the negative external electrode pin so that the first external electrode hole 151 and the second external electrode hole 161 and 181 can be electrically connected to each other.

The cathode connecting unit 150 and 170 and the anode connecting unit 160 and 180 may have a '⊏' shape. Therefore, when standing the cathode layer 110, the separation layer 130, and the anode layer 120 in the direction of a vertical axis, the first external electrode hole 151 can face in the direction of the vertical axis as shown in (b) of FIG. 6, and the first external electrode hole 151 can face in the direction of a horizontal axis as shown in (b) of FIG. 7. That is, since the connection with the external electrode becomes free according to products, the degree of freedom in product design can be increased.

Figure 4:
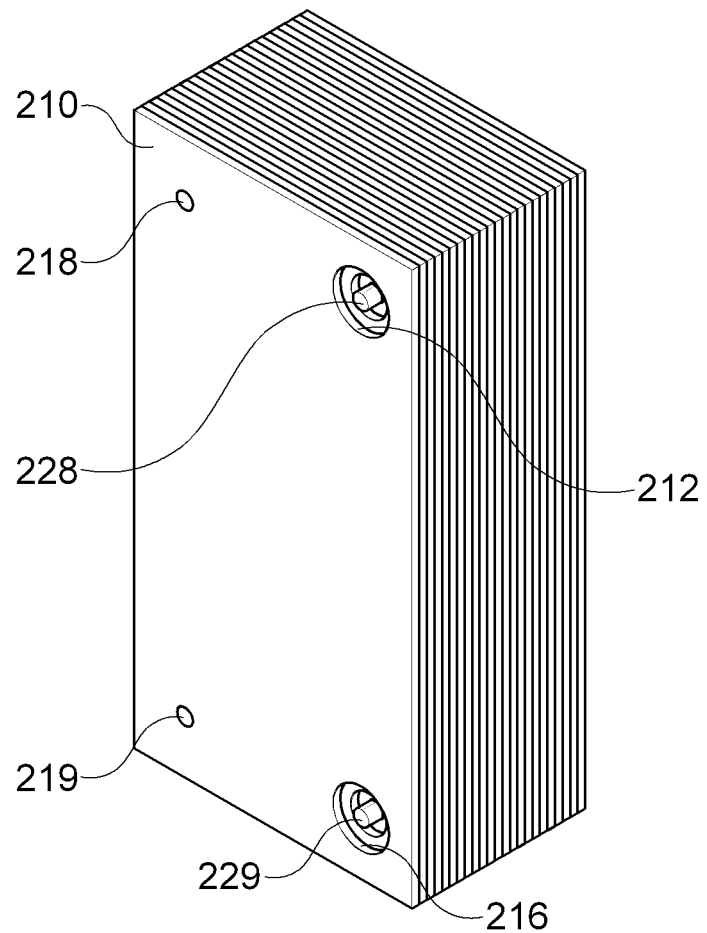
FIG. 4 is a view showing an energy storage apparatus in accordance with another embodiment of the present invention.
Figure 5:
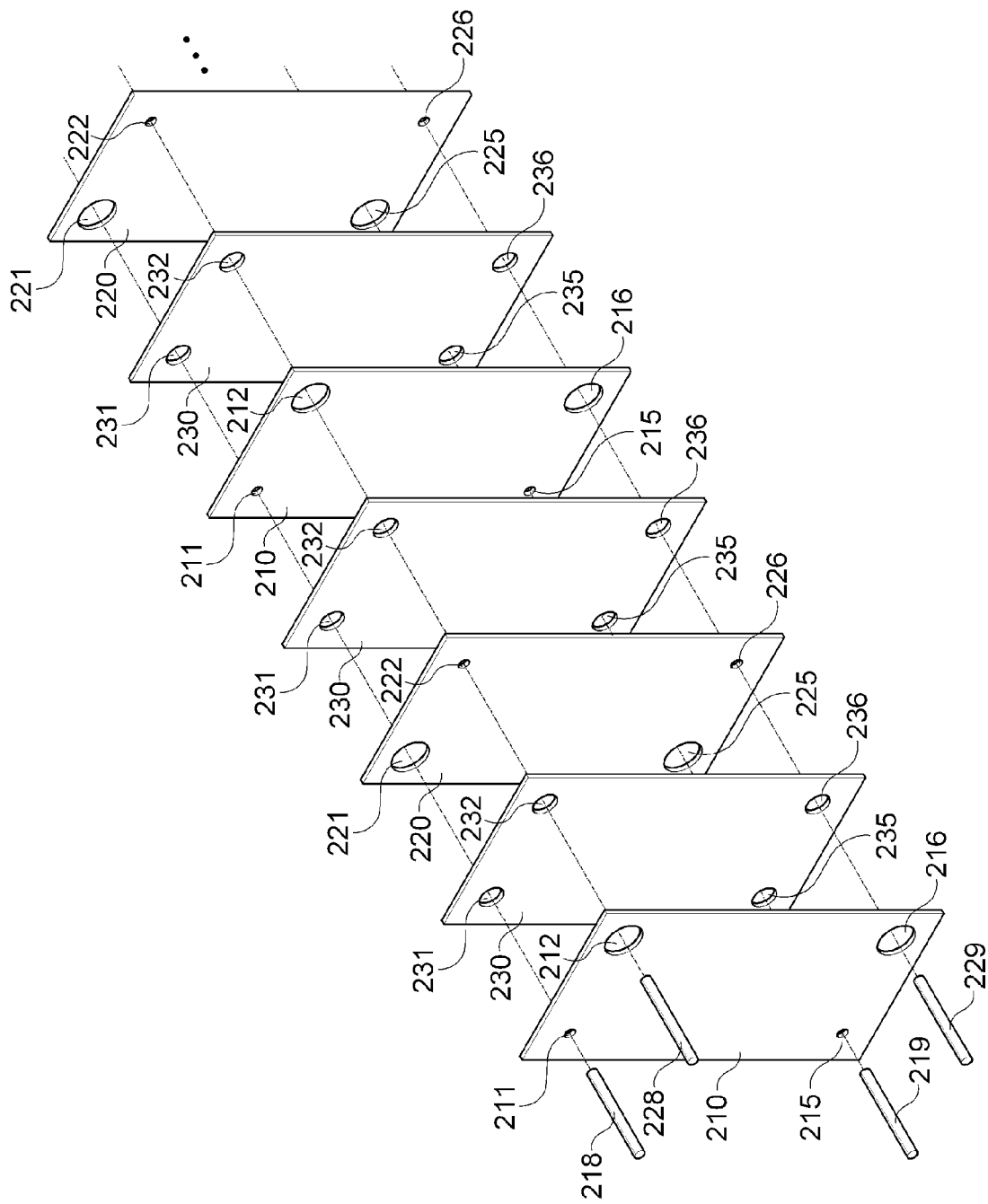
FIG. 5 is a view showing the stacking order of a cathode layer, a separation layer, and an anode layer in accordance with another embodiment of the present invention.

FIG. 4 is a view showing an energy storage apparatus in accordance with another embodiment of the present invention, and FIG. 5 is a view showing the stacking order of a cathode layer, a separation layer, and an anode layer in accordance with another embodiment of the present invention.

Referring to FIGS. 4 and 5, an energy storage apparatus 200 in accordance with another embodiment of the present invention includes a plurality of cathode layers 210 for storing positive charges; a plurality of anode layers 220 for storing negative charges; a plurality of separation layers 230 for electrically separating the cathode layers 210 and the anode layers 220; a first cathode hole 211 formed in the cathode layer 210 and formed with the same diameter as a positive external electrode pin to penetrate the positive external electrode pin therethrough and electrically short the positive external electrode pin and the cathode layer 210; a second cathode hole 212 formed in the cathode layer 210 and formed with a larger diameter than a negative external electrode pin to penetrate the negative external electrode pin therethrough and electrically open the negative external electrode pin and the cathode layer 210; a first anode hole 221 formed in the anode layer 220 and formed with a larger diameter than the positive external electrode pin to penetrate the positive external electrode pin therethrough and electrically open the positive external electrode pin and the anode layer 220; a second anode hole 222 formed in the anode layer 220 and formed with the same diameter as the negative external electrode pin to penetrate the negative external electrode pin therethrough and electrically short the negative external electrode pin and the anode layer 220; a cathode conducting unit for moving the positive charge between the plurality of cathode layers 210; and an anode conducting unit for moving the negative charge between the plurality of anode layers 220.

The cathode layer 210 and the anode layer 220 may be alternately separately stacked, and the separation layer 230 may be stacked between the cathode layer 210 and the anode layer 220.

In this case, the diameter of the first cathode hole 211 is the same as that of the positive external electrode connecting pin, and the diameter of the second cathode hole 212 is larger than that of the negative external electrode connecting pin. Further, the diameter of the first anode hole 221 is larger than that of the positive external electrode connecting pin, and the diameter of the second anode hole 222 is the same as that of the negative external electrode connecting pin. Therefore, a positive external electrode can be electrically connected to the cathode layer 210 through the first cathode hole 211, and a negative external electrode can be electrically connected to the anode layer 220 through the second anode hole 222. That is, the positive external electrode is not electrically connected to the anode layer 220, and the negative external electrode is not electrically connected to the cathode layer 210.

According to the shape of the external electrode, a first electrode pin 218, which is a conductor electrically connected to the first cathode hole 211, and a second electrode pin 228, which is a conductor electrically connected to the second anode hole 222, may be further included.

The separation layer 230 may serve as an insulating layer by electrically separating the cathode layer 210 and the anode layer 220. Therefore, the positive charge of the cathode layer 210 can move only to the corresponding cathode layer 210 or another cathode layer 210, and the negative charge of the anode layer 220 can move only to the corresponding anode layer 220 or another anode layer 220. That is, in the prior art, a path through which the positive charge or the negative charge moves to the external electrode is only the cathode hole or the anode hole, but according to the present invention, since the cathode conducting unit or the anode conducting unit is included as a new moving path of the positive charge or the negative charge, the movement of the charge becomes free. Therefore, since the path through which the positive charge or the negative charge moves to the external electrode becomes diverse, resistance of the charge during the movement of the charge is reduced and thus performance of the energy storage apparatus is improved.

In this case, as shown in FIGS. 4 and 5, the cathode layer 210, the anode layer 220, and the separation layer 230 may have a '☐' shape with the same size.

Descriptions overlapping with those of FIGS. 1 to 3 will be omitted.

The energy storage apparatus may further include a first conducting pin 219 for electrically connecting the plurality of cathode layers 210 to each other by vertically penetrating the cathode layers 210; and a second conducting pin 229 for electrically connecting the plurality of anode layers 220 to each other by vertically penetrating the anode layers 220, the cathode conducting unit may include a first cathode conducting hole 215 formed with the same diameter as the first conducting pin 219 to penetrate the first conducting pin 219 therethrough and electrically short the first conducting pin 219 and the cathode layer 210; and a second cathode conducting hole 216 formed with a larger diameter than the second conducting pin 229 to penetrate the second conducting pin 229 therethrough and electrically open the second conducting pin 229 and the cathode layer 210, and the anode conducting unit may include a first anode conducting hole 225 formed with a larger diameter than the first conducting pin 219 to penetrate the first conducting pin 219 therethrough and electrically open the first conducting pin 219 and the anode layer 220; and a second anode conducting hole 226 formed with the same diameter as the second conducting pin 229 to penetrate the second conducting pin 229 therethrough and electrically short the second conducting pin 229 and the anode layer 220.

The separation layer 230 may include a first separation hole 235 formed to penetrate the first conducting pin 219 therethrough; a second separation hole 236 formed to penetrate the second conducting pin 229 therethrough; a first separation electrode hole 231 formed to penetrate the positive external electrode pin therethrough; and a second separation electrode hole 232 formed to penetrate the negative external electrode pin therethrough.

The first separation hole 235 and the second separation hole 236 may be formed with a larger diameter than the first conducting pin 219 and the second conducting pin 229, and the first separation electrode hole 231 and the second separation electrode hole 232 may be formed with a larger diameter than the positive external electrode pin and the negative external electrode pin.

The first cathode hole 211 may be formed on the corner side opposite to the second cathode conducting hole 216 in the cathode layer 210, the second cathode hole 212 may be formed on the corner side opposite to the first cathode conducting hole 215 in the cathode layer 210, the first anode hole 221 may be formed on the corner side opposite to the second anode conducting hole 226 in the anode layer 220, and the second anode hole 222 may be formed on the corner side opposite to the first anode conducting hole 225 in the anode layer 220.

The energy storage apparatus 200 may further include a first external electrode for introducing the positive charge into the cathode layer 210 from the outside or discharging the positive charge from the cathode layer 210 to the outside; and a second external electrode for introducing the negative charge into the anode layer 220 from the outside or discharging the negative charge from the anode layer 220 to the outside.

Referring to (a) and (c) of FIG. 6 and (a) and (c) of FIG. 7, the energy storage apparatus 200 may further include a cathode connecting unit 250 and 270 which is formed on the first cathode hole 211 and first conducting pin 259 and 279 sides and has a shape of surrounding one side of the energy storage apparatus 200; and an anode connecting unit 260 and 280 which is formed on the second anode hole 222 and second conducting pin 269 and 289 sides and has a shape of surrounding the other side of the energy storage apparatus 200.

The inner surfaces of the cathode connecting unit 250 and 270 and the anode connecting unit 260 and 280 may be coated with an insulator.

The cathode connecting unit 250 and 270 may include a first connecting hole 255 and 275 electrically connected to the first conducting pin 259 and 279; and a first external electrode hole electrically connected to the positive external electrode pin, and the anode connecting unit 260 and 280 may include a second connecting hole electrically connected to the second conducting pin 269 and 289; and a second external electrode hole 261 electrically connected to the negative external electrode pin. Therefore, the first connecting hole 255 and 275 is formed with the same diameter as the first conducting pin 259 and 279 and the second connecting hole 266 and 286 is formed with the same diameter as the second conducting pin 269 and 289 so that the first connecting hole 255 and 275 and the second connecting hole 266 and 286 can be electrically connected to each other.

The cathode connecting unit 250 and 270 and the anode connecting unit 260 and 280 may have a '⊏' shape. Therefore, when standing the cathode layer 210, the separation layer 230, and the anode layer 220 in the direction of a vertical axis, the first external electrode hole 251 can face in the direction of the vertical axis as shown in (c) of FIG. 6, and the first external electrode hole 251 can face in the direction of a horizontal axis as shown in (c) of FIG. 7. That is, since the connection with the external electrode becomes free according to products, the degree of freedom in product design can be increased.

According to the present invention as above, a moving path of a charge becomes diverse in movement of the charge by forming another hole in addition to a hole connected to an external electrode and electrically connecting between the holes. Thus, resistance of the charge is reduced during the movement of the charge and performance of a supercapacitor is improved.

Although the present invention has been described in detail through the representative embodiments, it will be appreciated by those skilled in the art that various changes and modifications may be made in these embodiments without departing from the scope of the invention.

Therefore, the scope of the present invention should not be limited to the above-described embodiments but should be determined by the appended claims and any equivalents thereof.

What is claimed is:

1. An energy storage apparatus comprising:
a plurality of cathode layers for storing positive charges;
a plurality of anode layers for storing negative charges;
a plurality of separation layers for electrically separating the cathode layers and the anode layers;
a cathode hole formed in the cathode layer and electrically connected to a first external electrode;
an anode hole formed in the anode layer and electrically connected to a second external electrode;
a cathode conducting unit including a cathode conducting hole formed in each of the cathode layers and formed in a place different from the cathode hole, wherein the positive charges between the plurality of cathode layers are moved through the cathode conducting hole; and
an anode conducting unit including an anode conducting hole formed in each of the anode layers and formed in a place different from the anode hole, wherein the negative charges between the plurality of anode layers are moved through the anode conducting hole.

2. The energy storage apparatus according to claim 1, wherein the cathode layer and the anode layer are alternately separately stacked, and the separation layer is stacked between the cathode layer and the anode layer.

3. The energy storage apparatus according to claim 2, further comprising:
a first conducting pin for electrically connecting the plurality of cathode layers to each other by vertically penetrating the cathode layers; and
a second conducting pin for electrically connecting the plurality of anode layers to each other by vertically penetrating the anode layers, wherein the cathode conducting hole comprises:
a first cathode conducting hole formed with the same diameter as the first conducting pin to penetrate the first conducting pin therethrough and electrically short the first conducting pin and the cathode layer; and
a second cathode conducting hole formed with a larger diameter than the second conducting pin to penetrate the second conducting pin therethrough and electrically open the second conducting pin and the cathode layer, and the anode conducting hole comprises:
a first anode conducting hole formed with a larger diameter than the first conducting pin to penetrate the first conducting pin therethrough and electrically open the first conducting pin and the anode layer; and
a second anode conducting hole formed with the same diameter as the second conducting pin to penetrate the second conducting pin therethrough and electrically short the second conducting pin and the anode layer.

4. The energy storage apparatus according to claim 3, wherein the separation layer comprises:
a first separation hole formed to penetrate the first conducting pin therethrough; and
a second separation hole formed to penetrate the second conducting pin therethrough.

5. The energy storage apparatus according to claim 4, wherein the first separation hole and the second separation hole are formed with a larger diameter than the first conducting pin and the second conducting pin.

6. The energy storage apparatus according to claim 5, wherein the cathode hole is formed on the corner side opposite to the second cathode conducting hole in the cathode layer, and the anode hole is formed on the corner side opposite to the first anode conducting hole in the anode layer.

7. The energy storage apparatus according to claim 6, wherein the first external electrode introduces the positive charge into the cathode layer from the outside or discharges the positive charge from the cathode layer to the outside, and
the second external electrode introduces the negative charge into the anode layer from the outside or discharges the negative charge from the anode layer to the outside.

8. The energy storage apparatus according to claim 7, further comprising:
a cathode connecting unit formed on the cathode hole and first conducting pin sides and having a shape of surrounding one side of the energy storage apparatus; and
an anode connecting unit formed on the anode hole and second conducting pin sides and having a shape of surrounding the other side of the energy storage apparatus.

9. The energy storage apparatus according to claim 8, wherein the cathode connecting unit and the anode connecting unit have '⊏' shape.

10. The energy storage apparatus according to claim 9, wherein the inner surfaces of the cathode connecting unit and the anode connecting unit are coated with an insulator.

11. The energy storage apparatus according to claim 10, wherein the cathode connecting unit comprises:
a first connecting hole electrically connected to the first conducting pin; and
a first external electrode hole electrically connected to a positive external electrode pin, and the anode connecting unit comprises:
a second connecting hole electrically connected to the second conducting pin; and
a second external electrode hole electrically connected to a negative external electrode pin.

12. An energy storage apparatus comprising:
a plurality of cathode layers for storing positive charges;
a plurality of anode layers for storing negative charges;
a plurality of separation layers for electrically separating the cathode layers and the anode layers;
a first cathode hole formed in the cathode layer and formed with the same diameter as a positive external electrode pin to penetrate the positive external electrode pin therethrough and electrically short the positive external electrode and the cathode layer;
a second cathode hole formed in the cathode layer and formed with a larger diameter than a negative external electrode pin to penetrate the negative external electrode pin therethrough and electrically open the negative external electrode pin and the cathode layer;
a first anode hole formed in the anode layer and formed with a larger diameter than the positive external electrode pin to penetrate the positive external electrode pin therethrough and electrically open the positive external electrode pin and the anode layer;
a second anode hole formed in the anode layer and formed with the same diameter as the negative external electrode pin to penetrate the negative external electrode pin therethrough and electrically short the negative external electrode pin and the anode layer;

a cathode conducting unit for moving the positive charge between the plurality of cathode layers; and an anode conducting unit for moving the negative charge between the plurality of anode layers.

13. The energy storage apparatus according to claim 12, wherein the cathode layer and the anode layer are alternately separately stacked, and the separation layer is stacked between the cathode layer and the anode layer.

14. The energy storage apparatus according to claim 13, further comprising:

a first conducting pin for electrically connecting the plurality of cathode layers to each other by vertically penetrating the cathode layers; and a second conducting pin for electrically connecting the plurality of anode layers to each other by vertically penetrating the anode layers, wherein the cathode conducting unit comprises:

a first cathode conducting hole formed with the same diameter as the first conducting pin to penetrate the first conducting pin therethrough and electrically short the first conducting pin and the cathode layer; and a second cathode conducting hole formed with a larger diameter than the second conducting pin to penetrate the second conducting pin therethrough and electrically open the second conducting pin and the cathode layer, and the anode conducting unit comprises:

a first anode conducting hole formed with a larger diameter than the first conducting pin to penetrate the first conducting pin therethrough and electrically open the first conducting pin and the anode layer; and a second anode conducting hole formed with the same diameter as the second conducting pin to penetrate the second conducting pin therethrough and electrically short the second conducting pin and the anode layer.

15. The energy storage apparatus according to claim 14, wherein the separation layer comprises:

a first separation hole formed to penetrate the first conducting pin therethrough;

a second separation hole formed to penetrate the second conducting pin therethrough;

a first separation electrode hole formed to penetrate the positive external electrode pin therethrough; and a second separation electrode hole formed to penetrate the negative external electrode pin therethrough.

16. The energy storage apparatus according to claim 15, wherein the first separation hole and the second separation hole are formed with a larger diameter than the first conducting pin and the second conducting pin, and the first separation electrode hole and the second separation electrode hole are formed with a larger diameter than the positive external electrode pin and the negative external electrode pin.

17. The energy storage apparatus according to claim 16, wherein the first cathode hole is formed on the corner side opposite to the second cathode conducting hole in the cathode layer, the second cathode hole is formed on the corner side opposite to the first cathode conducting hole in the cathode layer, the first anode hole is formed on the corner side opposite to the second anode conducting hole in the anode layer, and the second anode hole is formed on the corner side opposite to the first anode conducting hole in the anode layer.

18. The energy storage apparatus according to claim 17, further comprising:

a first external electrode for introducing the positive charge into the cathode layer from the outside or discharging the positive charge from the cathode layer to the outside; and a second external electrode for introducing the negative charge into the anode layer from the outside or discharging the negative charge from the anode layer to the outside.

19. The energy storage apparatus according to claim 18, further comprising:

a cathode connecting unit formed on the cathode hole and first conducting pin sides and having a shape of surrounding one side of the energy storage apparatus; and an anode connecting unit formed on the anode hole and second conducting pin sides and having a shape of surrounding the other side of the energy storage apparatus.

20. The energy storage apparatus according to claim 19, wherein the cathode connecting unit and the anode connecting unit have a '⊏' shape.

21. The energy storage apparatus according to claim 20, wherein the inner surfaces of the cathode connecting unit and the anode connecting unit are coated with an insulator.

22. The energy storage apparatus according to claim 21, wherein the cathode connecting unit comprises:

a first connecting hole electrically connected to the first conducting pin; and a first external electrode hole electrically connected to the positive external electrode pin, and the anode connecting unit comprises:

a second connecting hole electrically connected to the second conducting pin; and a second external electrode hole electrically connected to the negative external electrode pin.

* * * * *